(12) United States Patent
Van Wageningen

(10) Patent No.: US 11,483,073 B2
(45) Date of Patent: Oct. 25, 2022

(54) INTERFERENCE HANDLING BY AUTOMATIC TIME SLOT ALLOCATION FOR MULTIPLE COORDINATORS

(71) Applicant: SIGNIFY HOLDING B.V., Eindhoven (NL)

(72) Inventor: Andries Van Wageningen, Wijlre (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/291,743

(22) PCT Filed: Nov. 13, 2019

(86) PCT No.: PCT/EP2019/081182
§ 371 (c)(1),
(2) Date: May 6, 2021

(87) PCT Pub. No.: WO2020/104274
PCT Pub. Date: May 28, 2020

(65) Prior Publication Data
US 2022/0014271 A1 Jan. 13, 2022

(30) Foreign Application Priority Data

Nov. 23, 2018 (EP) .................... 18208083

(51) Int. Cl.
*H04B 10/00* (2013.01)
*H04B 10/114* (2013.01)
*H04B 10/116* (2013.01)

(52) U.S. Cl.
CPC ....... *H04B 10/1149* (2013.01); *H04B 10/116* (2013.01)

(58) Field of Classification Search
CPC . H04B 10/1149; H04B 10/116; H04W 28/16; H04W 4/08; H04W 64/00;
(Continued)

(56) References Cited

U.S. PATENT DOCUMENTS 8,270,369 B1 * 9/2012 Chang ................... H04W 36/02
370/332
2009/0310971 A1 12/2009 Kim et al.
(Continued)

FOREIGN PATENT DOCUMENTS

EP 3422772 A1 1/2019
WO 2017156748 A1 9/2017
(Continued)

*Primary Examiner* — Hibret A Woldekidan

(57) ABSTRACT

In a wireless optical network with multiple coordinators or other access points, the coverage area of coordinators may overlap. Interference in the communication between coordinators and devices may occur in these overlapping coverage areas. Various embodiments propose an automatic allocation of reserved time slots to coordinators. These time slots support the coordinators to advertise their presence without interference and enable device to detect the presence of a neighbour coordinator in a single MAC cycle. Fast detection allows fast re-scheduling of time slots in the wireless optical network in order to prevent interference when a device that enters the overlapping coverage area of two coordinators.

20 Claims, 4 Drawing Sheets

(58) Field of Classification Search
CPC . H04W 72/0446; H04W 72/048; H04W 4/30;
H04W 4/33; H04W 4/02; H04W 4/026;
H04W 4/029; H04W 4/40; H04W 4/023;
H04W 12/06; H04W 12/77; H04W 84/12;
H04W 88/08; H04W 36/08; H04W 48/20;
H04W 72/04; H04W 72/0406; H04W
72/0433; H04W 72/0426; H04L 47/24;
H04L 47/28; H04J 14/0227; H04J
14/0241; H04J 14/08; H04Q 2011/0064
USPC .................................. 398/127, 118, 128, 172
See application file for complete search history.

(56) References Cited

U.S. PATENT DOCUMENTS

| | | | |
|---|---|---|---|
| 2011/0105134 A1 | 5/2011 | Kim et al. | |
| 2014/0172966 A1* | 6/2014 | Lechner | H04L 65/611 |
| | | | 709/204 |
| 2015/0341130 A1* | 11/2015 | Zhou | H04W 28/18 |
| | | | 370/336 |
| 2019/0020414 A1* | 1/2019 | Jiang | H04W 74/04 |

FOREIGN PATENT DOCUMENTS

| | | |
|---|---|---|
| WO | 201800148 A1 | 1/2018 |
| WO | 2018001481 A1 | 1/2018 |

\* cited by examiner

INTERFERENCE HANDLING BY AUTOMATIC TIME SLOT ALLOCATION FOR MULTIPLE COORDINATORS

CROSS-REFERENCE TO PRIOR APPLICATIONS

This application is the U.S. National Phase application under 35 U.S.C. § 371 of International Application No. PCT/EP2019/081182, filed on Nov. 13, 2019, which claims the benefit of European Patent Application No. 18208083.8, filed on Nov. 23, 2018. These applications are hereby incorporated by reference herein.

FIELD OF THE INVENTION

The invention relates to the field of scheduling transmissions in optical wireless networks, such as—but not limited to—LiFi networks, for use in various different applications for home, office, retail, hospitality and industry.

BACKGROUND OF THE INVENTION

Wireless optical networks, such as LiFi networks (named like Wi-Fi networks), enable electronic devices like laptops, tablets, and smartphones to connect wirelessly to the internet. Wi-Fi achieves this using radio frequencies, but LiFi achieves this using the light spectrum which can enable unprecedented data and bandwidth. It's important to consider that wireless data is required for more than just our traditional connected devices—today televisions, speakers, headphones, printer's, virtual reality (VR) goggles and even refrigerators use wireless data to connect and perform essential communications. Radio frequency technology like Wi-Fi is running out of spectrum to support this digital revolution and LiFi can help power the next generation of immersive connectivity.

Visible-light communication (VLC) transmits data by intensity modulating optical sources, such as light emitting diodes (LEDs) and laser diodes (LDs), faster than the persistence of the human eye. VLC merges lighting and data communications in applications such as area lighting, signboards, streetlights, vehicles, and traffic signals. The IEEE 802.15.7 visible-light communication personal area network (VPAN) standard maps the intended applications to four topologies: peer-to-peer, star, broadcast and coordinated. Optical Wireless PAN (OWPAN) is a more generic term than VPAN also allowing invisible light, such as infrared (IR) light, for communication. Contrary to radio frequency (RF) communication, VLC typically requires a line-of-sight connection between the transmitter and the receiver.

In a star topology, the communication is established between devices and a single central controller, called the coordinator. In a peer-to-peer topology, one of two devices in an association takes on the role of the coordinator. In a coordinated topology, multiple devices communicate with multiple coordinators, supervised by a global controller. The global controller has a fixed network link to each coordinator. To scale up a system from one OWPAN to two or more OWPANs, the global controller function has been proposed to handle interference and hand-over between overlapping OWPANs. The global controller or network controller function manages the coordinators, while each coordinator controls its OWPAN. The global controller function can be connected to the coordinators via a separate network.

The above centralized approach has the disadvantage that the system relies on the availability of the central service or server, e.g., the global controller. If the global controller fails or the connection between the global controller and the coordinators fails, the coordinators lack control. Moreover, for a small system with only a few coordinators, it may also be a hurdle to install this global control service for a quick and easy installation of the system.

However, in decentralized LiFi systems without global control function, the coordinators often do not "see" each other due to the line-of-sight character between a coordinator and a connected local LiFi device. The coordinator may therefore not be able to directly measure any significant interference caused by a neighbour coordinator.

US patent application 2009/0310971 A1 discloses a time-sharing visible light communication system. US patent application US2011/0105134 A1 discloses a method and an apparatus for guaranteeing terminal mobility in a time division visible light communication system. WO 2018/001481 A1 discloses a method whereby a coordinator controls communication between visible light communication access points user equipment. International patent application WO2017/156748 A1 discloses a beacon sending method for use in an optical communication technology, wherein a device may request a beacon from a coordinator when the device is located in an interference area between a first network in which the coordinator is located and a second network.

SUMMARY OF THE INVENTION

It is an object of the present invention to provide a solution for detecting and handling interference caused by a device which enters an overlapping coverage area of neighbouring coordinators.

This object is achieved by a system as claimed in claim 1, an access point as claimed in claim 3, a central control entity as claimed in claim 11, by a method as claimed in claim 14, and by a computer program product as claimed in claim 15.

According to a first aspect, a system is provided for handling interference in a wireless optical network comprising at least two access points (e.g. coordinators or other access devices of the wireless optical network) and at least one device selectively associated via a line-of-sight connection to a respective one of the access points, wherein the system is adapted to automatically allocate at least one respective reserved time slot of a Medium Access Control, MAC, cycle to each of the access points;

wherein the system is adapted to select different reserved time slots of a single MAC cycle at least for neighbouring ones of the access points;

wherein the access points are adapted to broadcast their advertisements by using their allocated reserved time slots of the MAC cycle; and wherein the at least one device is adapted to detect neighbouring access points based on a reception of their advertisements in different time slots of the single MAC cycle.

Accordingly, reserved time slots of a MAC cycle can be automatically allocated to the access devices (e.g. coordinators of a LiFi network). These time slots support the coordinators to advertise their presence without interference and enable an associated device to detect the presence of a neighbour coordinator in a single MAC cycle. Such a fast detection within one MAC cycle allows fast re-scheduling of time slots in the wireless optical network in order to prevent interference when a device enters an overlapping coverage area of two coordinators.

The system further comprise a central control entity adapted to update time slot allocations of the at least two access points based on at least one of interference reports and neighbour detection reports received from the at least two access points, wherein the interference reports and the neighbour detection reports are based on corresponding reports from the at least one device (30) or other devices. Thereby, the distributed allocation approach by the access points can be combined with an additional central approach by the central control entity (e.g. a global controller or the like) to thereby increase efficiency and reliability of the slot allocation and further reduce interference probability.

A set of time slots available for allocation by the central control entity may be smaller than a set of time slots available for allocation by the at least two access points. Thereby, allocation flexibility can be increased for the distributed approach.

According to a second aspect directed to an access point (e.g. a coordinator) or a central control entity (e.g. a global controller), an apparatus is provided for handling interference in a wireless optical network comprising at least two access points and at least one device selectively associated via a line-of-sight connection to a respective one of the access points, wherein the apparatus is adapted to allocate at least one reserved time slot of a MAC cycle for sending advertisements by one of the at least two access points; and wherein the apparatus is adapted to select the reserved time slot so that it differs from the reserved time slot of a neighbouring access point.

The apparatus may be adapted to receive a report about a detected neighbouring access point from the at least one device, to report the neighbour detection to the neighbouring access point, and to update a list of neighbouring access points. Thereby, the neighbouring access points can be informed about its out-of-sight neighbours.

The apparatus may be adapted to report the neighbour detection to a central control entity of the wireless optical network. This measure provides the advantage that a central approach is added so that better global allocation efficiency can be achieved.

According to a first option of the second aspect, the apparatus may be adapted to send a first type of the advertisements (which may for example be used for neighbour detection) in time slots at which contention with neighbouring coordinators may occur and a second type of the advertisements (which may be used for interference detection) in the allocated reserved time slots. Thus, communication by the access points can be directed to different types of time slots based on its importance or sensibility to interference. In an example, the time slots for the first type of advertisements may be randomly selected from a common advertisement period.

Thus, knowledge on the neighbour relation topology of the access points can be accumulated by using the above two types of advertisements. The first type of advertisements can be used to build up neighbour relations of access points in order to automatically allocate interference-free time slots for the second type of advertisements. Optionally, to speed up establishing the neighbour relation topology, an installer may put the system into a configuration mode in which the first type of advertisements are more frequently broadcasted at the cost of consuming large part of the available timeslots.

Hence, for building up the neighbour relation topology, it is not necessary that a device is actually present in the overlapping area of two access points. The system just needs to remember that a device was present in the overlapping area of two access points.

In the above first option of the second aspect, the apparatus may be adapted to increase a frequency of sending the first type of the advertisements when it determines that the wireless optical network is in a configuration mode. Thereby, the frequency can be enhanced during the configuration mode where less data traffic is expected.

According to a second option of the second aspect, which can be combined with the above first option of the second aspect, the apparatus may be adapted to determine a neighbour occupancy level for each time slot of the MAC cycle based on the reserved time slots of neighbouring access points. This provides the advantage that the slot allocation process can be improved by considering the neighbour occupancy level of each available slot.

In the above second option of the second aspect, the apparatus may be adapted to increase the neighbour occupancy level of a time slot based on an interference reported for the time slot. Thereby, the likelihood of allocation will be reduced for time slots with detected interference.

According to a third option of the second aspect, which can be combined with any of the above first to third options of the second aspect, the apparatus may be adapted to exchange information about the at least one reserved time slot with the neighbouring access point and to update the time slot allocation in response to a detection that the same reserved time slot has been allocated to neighbouring access points. This measure prevents that same time slots are reserved at neighbouring access devices.

In the above third option of the second aspect, the apparatus may be adapted to update the time slot allocation in response to a detection that same reserved time slots have been allocated and that an own total occupancy level of all time slots is lower than that of the neighbouring access point. The additional consideration of the total occupancy level provides the advantage that the allocation update is performed by the access point with lower occupancy level, so that the newly reserved time slot will be less occupied.

Furthermore, in the above third option of the second aspect, the apparatus may be adapted to update the time slot allocation by reserving one of the least occupied time slots of the MAC cycle. This measure ensures that only time slots with the least occupancy are selected for allocation as reserved time slots.

Additionally, in the above third option of the second aspect, the apparatus may be adapted to update the time slot allocation based on at least one of an allocation update and a total occupancy level of the neighbouring access point, received from a central control entity. Thereby, global considerations by the central control entity may advantageously by used to increase the efficiency of the allocation update.

Moreover, in the above third option, the apparatus may be adapted to request the allocation update from the central control unit in response to a detection that all available time slots are occupied. Thus, additional allocation options can be derived from the global perspective of the central control entity.

Also disclosed is a device that can be associated to an access point (e.g. a coordinator), an apparatus is provided for handling interference in a wireless optical network comprising at least two access points and at least one device selectively associated via a line-of-sight connection to a respective one of the access points, wherein the apparatus is adapted to receive advertisements from different access points in different reserved time slots of a MAC cycle; and wherein the apparatus is adapted to detect neighbouring access points based on advertisements received in different time slots of a single MAC cycle.

The apparatus may be adapted to report a neighbour detection to an associated access point by means of the line-of-sight connection. The reported neighbour detection can be used by the associated access point to trigger a joint allocation update with the detected neighbouring access point.

Further disclosed is a procedure at an access point (e.g. a coordinator) being a method for handling interference in a wireless optical network comprising at least two access points and at least one device selectively associated via a line-of-sight connection to a respective one of the access points, the method comprising:

automatically allocating at least one respective reserved time slot of a MAC cycle to each of the access points;

selecting different reserved time slots of a single MAC cycle at least for neighbouring ones of the access points; and sending advertisements from the access points to the devices by using the allocated reserved time slots of the MAC cycle, so that advertisements of neighbouring access points are received in different time slots of the single MAC cycle.

According to a third aspect directed to a procedure at a device that can be associated to an access point (e.g. a coordinator), a method is provided for handling interference in a wireless optical network comprising at least two access points and at least one device selectively associated via a line-of-sight connection to a respective one of the access points, the method comprising:

receiving advertisements from different access points at the at least one device in different reserved time slots of a MAC cycle; and detecting neighbouring access points based on their advertisements in different time slots of a single MAC cycle.

According to a fourth aspect, a computer program product may be provided, which comprises code means for producing the steps of the above methods of the second or third aspects when run on a computer device.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the system, the access point, the central control entity, the method and the computer program product of the invention may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Embodiments of the present invention are now described based on a LiFi network environment with coordinators having overlapping coverage areas.

The following embodiments are directed to an allocation of reserved time channels or reserved time slots.

Figure 1:
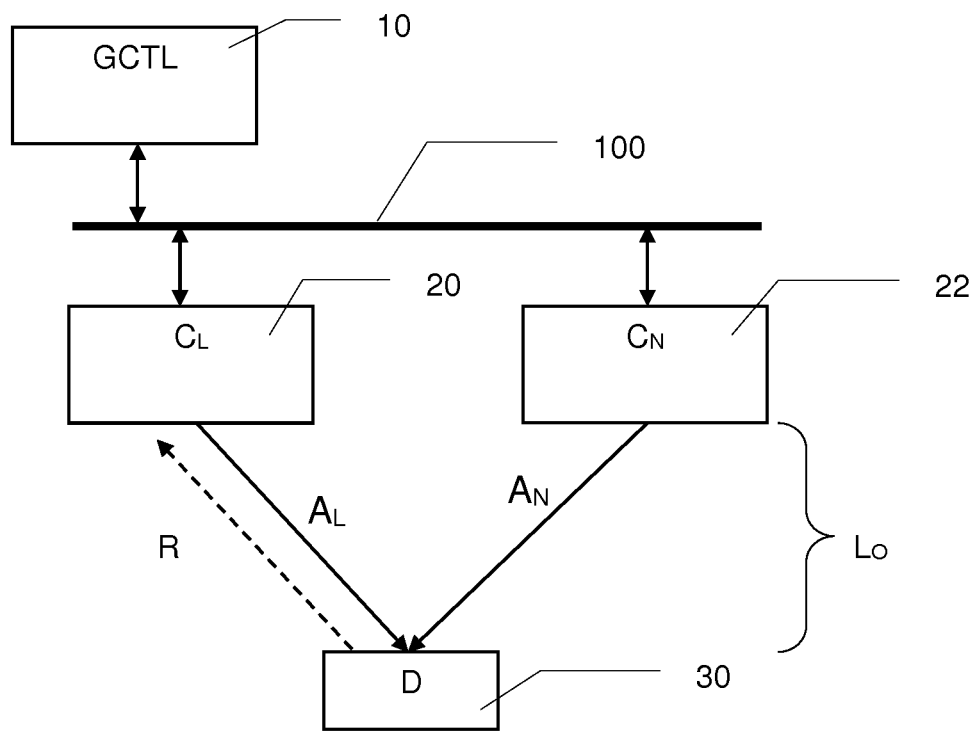
FIG. 1 shows a schematic architecture of a wireless optical network with a global control function, in which various embodiments can be implemented.

FIG. 1 shows a schematic network architecture with communication facilities for interference handling based on a coordinated topology. A local coordinator (CL) 20 and at least one neighbour coordinator (CN) 22 are adapted to emit their advertisements $A_L$, $A_N$ and to receive reports R to/from at least one associated end device 30 via optical links $L_O$. Additionally, the coordinators 20, 22 are connected via a fixed wired backbone network 100, to which a global controller (GCTL) 10 may optionally be connected as well.

As the optical links $L_O$ between the coordinators 20, 22 and the associated end devices may be implemented with a certain directivity, it is very likely that there is no line-of-sight connection between the coordinators 20, 22 and thus no direct communication between them by means of optical links. In optical communication, the directivity of light or light guidance plays an important role and can preclude nearby or even neighbouring nodes from being invisible to other nodes (in contrast to radio frequency (RF) communication).

To become an associated device, the device 30 needs to do a network discovery and initiate a network join process. This is usually done when the device 30 is first started and is not associated with any network. Once the network discovery is finished and a potential parent (e.g. the local coordinator 20) has been selected by the device 30 e.g. based on its advertisement $A_L$, the device 30 will start the network join process by issuing a network join request. The network join request will call a MAC's association service and issue an association request to the potential parent. When the device 30 has received a network join response and the join was successful, it will update its network and MAC information tables to include the new network address of the wireless optical network and also update its neighbour table to specify its new parent.

To mitigate interference in the example of FIG. 1, the local coordinator 20 should react fast when the local (end) device 30 enters the coverage area of the neighbour coordinator 22. It is therefore important that the local device 30 detects the neighbour coordinator 22 in a fast manner. To enable such fast detection, the coordinator 20 and the neighbour coordinator 22 may send their advertisements $A_L$, $A_N$ on different slots of a globally aligned Medium Access Control (MAC) cycle.

Figure 2:
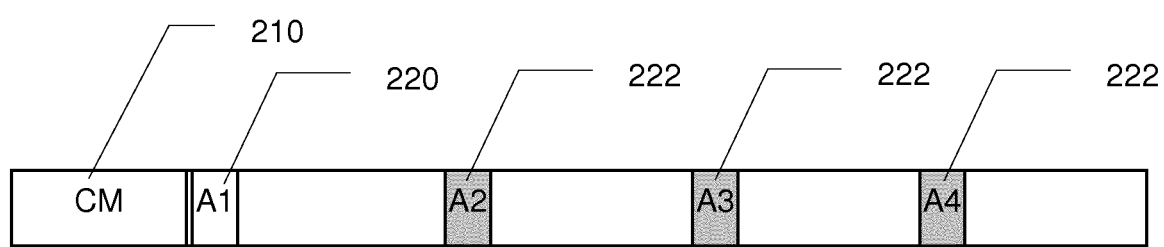
FIG. 2 shows a schematic representation of a MAC cycle with reserved coordinator time slots.

FIG. 2 shows an example of a MAC cycle for a coordinator with an initial common field (CM) 210. The common field 210 can be used by the coordinator for a first type of advertisements in time slots at which contention with neighbouring coordinators may occur. The coordinator may randomly select one or more of these time slots for this first type of advertisements. The allocated time for the common field can be increased in the configuration mode to keep the probability that the advertisements collide acceptably low when the frequency of sending the first type of the advertisements is increased. According to various embodiments, a first slot (A1) 220 is reserved for the coordinator 20 and further subsequent slots (A2-A4) 222 are reserved for its neighbour coordinators, e.g., the neighbour coordinator 22 in FIG. 1.

Such reserved time channels or time slots for coordinator advertisements can be allocated by a central approach or by a distributed approach, wherein the distributed approach may or may not involve a communication between the coordinators 20, 22.

Various embodiments therefore focus on an automatic allocation of at least one reserved time slot per coordinator for advertising its presence with a minimum of interference, wherein a local device (e.g. device 30 in FIG. 1) is to be understood as a device associated to a local coordinator (e.g. local coordinator 20 in FIG. 1), an interference device is to be understood as a device that has detected presence of a local coordinator and a neighbour coordinator, and a neighbour coordinator (e.g. neighbour coordinator 22 in FIG. 1) is to be understood as a coordinator with a coverage area that overlaps with that of the local coordinator. The overlapping coverage area of the local coordinator and the neighbour coordinator can be defined as the area in which a local device can receive advertisements from the neighbour coordinator in addition to the communication with the local coordinator.

Figure 3:
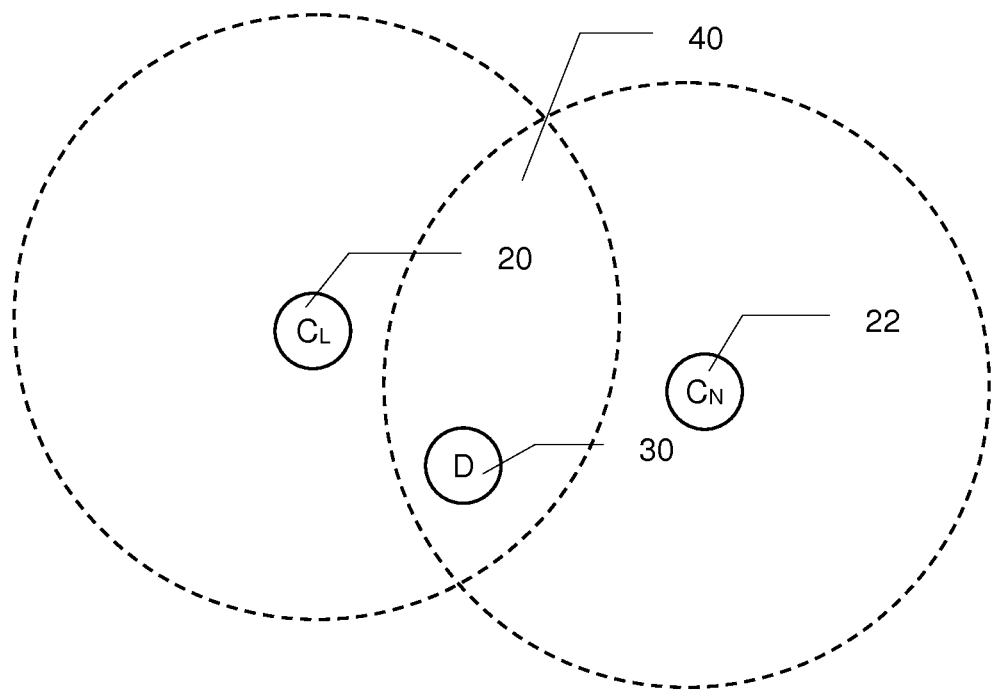
FIG. 3 shows a schematic representation of two coverage areas of neighbouring coordinators with an overlapping area.

FIG. 3 schematically shows coverage areas of two neighbouring coordinators. The boarders of these coverage areas are indicated as respective dashed circles. The overlapping portion of these coverage areas indicates the overlapping coverage area 40.

According to a so-called cooperative scheduling approach, it is assumed that, in a pre-configuration, each of the coordinators 20, 22 of FIG. 1 has been assigned ownership of a time channel in the MAC cycle such that the two neighbouring coordinators 20, 22 always have different time channels (pre-configuration). Each of the coordinators 20, 22 may then reserve a basic time period (e.g. time slot) in its owned time channel to establish interference free communication with devices in its reach. Each of the coordinators 20, 22 applies a dedicated advertisement period that falls within the basic reserved time slot in which it broadcasts its presence to devices in its reach, e.g., the local device 30. Then, a device in reach of the two of more coordinators 20, 22 receives their respective advertisements AL, AN at separate time slots of the MAC cycle and reports back the detection of multiple coordinators in a dedicated period of its report R. As an example, a dedicated slot may by allocated for each coordinator 20, 22 in a MAC cycle for sending its advertisements.

However, if the pre-configuration is absent in the above cooperative scheduling approach, or the network changes, e.g., by adding a new coordinator or by removing a screen between the two coordinators 20, 22, a mechanism is needed to establish or modify the time channel allocations. For example, if the two coordinators 20, 22 are hidden by a screen, they may have been allocated the same time channel and so they may send their respective advertisements $A_L$, $A_N$ at the same time. If the screen is removed, they may need a re-allocation of time channels for the handling.

In the following, different interference handling approaches are explained based on the schematic network architecture shown in FIG. 1

In a central approach with collection of neighbour relationships, each of the coordinators 20, 22 communicates and updates its neighbour coordinator detection results via the backbone network 100 to the global controller 10. The global controller 10 determines a time channel for each of the coordinators 20, 22 and communicates the result to them. When the global controller 10 has provided a time channel to all coordinators, the global controller 10 broadcasts a trigger to set the communicated time channels into operation. The coordinators 20, 22 then start using the corresponding time channels e.g. for their advertisements $A_N$, $A_L$.

Furthermore, in a distributed approach with communication (i.e. information exchange via the backbone network 100), each of the coordinators 20, 22 first collects neighbour relations with a neighbour detection process. This can be achieved in that each of the coordinators 20, 22 synchronously runs an iteration process thereby taking the following two steps at each iteration. In the first step, the coordinator calculates a weight factor for itself and its neighbours not having a channel allocated. If it has the maximum weight, it chooses a time channel and broadcasts this allocation. In the subsequent second step, the coordinator updates its neighbourhood information and broadcasts an update message containing information for calculating weight factors.

Additionally, a distributed approach without communication relies on the detection of interference. In a first step, each of the coordinators 20, 22 initially allocates an equal probability to each time channel (e.g. 1/c where c corresponds to the number of channels). Then, in a second step, one of the coordinators 20, 22 chooses a time channel with weighted probability and measures the interference level to determine if this choice was successful. If successful, it sets the probability for this time channel to "1" and for the other time channels to "0". If not successful, it decreases the probability with a certain factor for this time channel and re-distributes the reduction of this weight evenly over the other time channels. Finally, the procedure returns to the second step.

The above distributed approach with communication may need extensive time-consuming and load-increasing communication between the coordinators. The above distributed approach without communication overcomes this problem but depends on the determination of an interference level. In the envisioned LiFi systems, coordinators often do not "see" each other due to the line-of sight character between a coordinator and a connected local LiFi device. A coordinator can therefore not directly measure any significant interference caused by a neighbour coordinator.

Furthermore, the above distributed approach without communication may need a high number of iteration steps before reaching a final resolution. A worst-case scenario would be that a LiFi system is in full operation with many devices assigned to the LiFi-network and then a condition changes causing two neighbour coordinators to detect their neighbourhood. Such a change may propagate to the other coordinators, leading to many iterations until a final set of time channels is reached. Such an iterative change of time channels may however disturb the interference handling based on the above cooperative scheduling approach.

According to various embodiments, a neighbour coordinator detection process is proposed, which makes use of type 1 advertisements sent in time slots at which contention with neighbour coordinators may occur. These type 1 advertisements are sent randomly in time e.g. during the common period 210 of FIG. 2, which is intended for contention access of the coordinators only and not for the devices. In various embodiments, it may be sufficient to restrict use of the type 1 advertisements to advertising presence and identity of a coordinator in the common period 210. However, the common period is just an example. In principle, any part of the MAC cycle may be assigned for exclusive contention access of coordinators.

Optionally, an additional interference detection process may be provided for type 2 advertisements sent in allocated reserved time slots. A coordinator maintains at least one time slot for that purpose.

Furthermore, a reserved time slot allocation process is proposed, where a reserved time slot is intended to be contention-free with a minimum of interference from neighbour coordinator communication. For the reserved time slot allocation process a central and distributed approach may be combined to overcome the disadvantages of each and make use of the advantages of each.

As already mentioned above, the central approach has the advantage that it can determine an optimal allocation of reserved time slots since it collects all necessary information at one place (e.g. the global coordinator 10 in FIG. 1). Moreover, it can keep the iterations hidden before reaching the final solution, so that it will not disturb the interference handling process during this iteration process. It further reduces the communication overhead for each iteration step.

The distributed approach provides the advantage of not relying on a central server (e.g. the global coordinator 10 in FIG. 1). If a central server fails or loses connection to the coordinators for a certain time, the coordinators can continue to operate. The distributed algorithm can be relaxed in the sense that the reserved slots it allocates do not have to be completely contention free, because the central server can repair these short comes when it is available again.

Further, the number of time slots from which the distributed process may choose may be higher than the minimum number of time slots necessary to achieve non-interfering time slots for the neighbour coordinators. If the central server additionally allocates the minimum amount of interference-free time slots, it makes the spare time slots free for the distributed allocation process.

A combination of the central approach and the distributed approach allows to simplify the distributed algorithm as well as the number of iterations to find an acceptable intermediate solution for the time that the central service is not available. Therefore, a simple distributed algorithm for coordinators as well as a way of combining it with the central approach can be provided.

Figure 4:
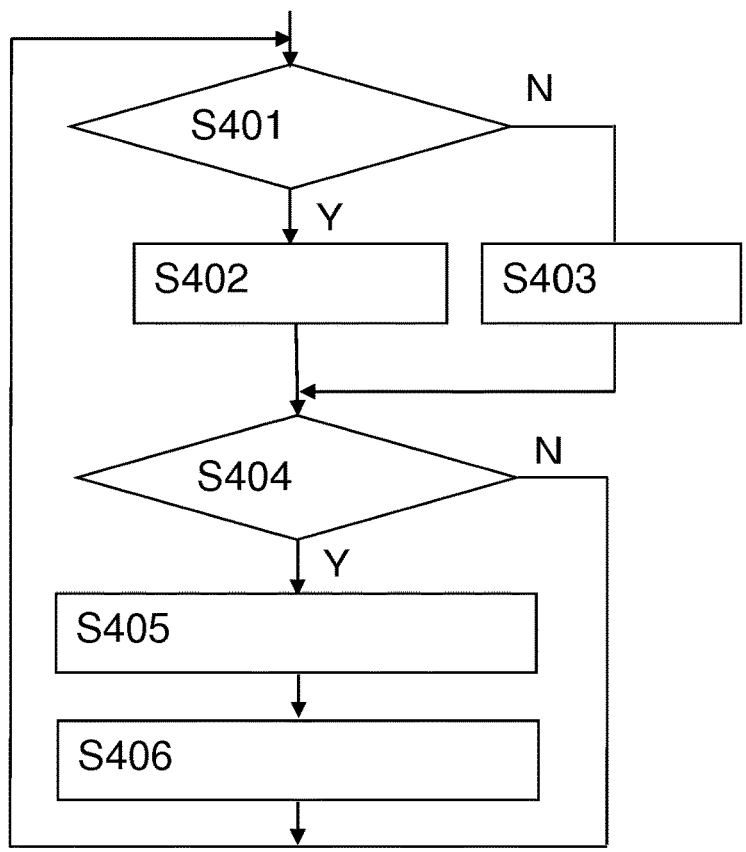
FIG. 4 shows a flow diagram of a neighbour coordinator detection procedure.

FIG. 4 shows a flow diagram of a neighbour coordinator detection process which may be implemented in a coordinator in various embodiments. It is an automatic continuously running process to detect the presence of neighbour coordinators when a local device is in the coverage area of a neighbour coordinator.

The process is now described with reference to the network architecture of FIG. 1.

The coordinators 20, 22 communicate with each other and with the global controller 10 via the backbone 100. Furthermore, the coordinators 20, 22 communicate with the local device 30 or other devices via the optical links $L_o$.

Each of the coordinators 20, 22 sends type 1 advertisements randomly in time. In step S402, it is determined whether the network is in the normal operation mode (and not in the configuration mode). If the network is in the normal operation, the procedure continues with step S402 and the type 1 advertisements are sent relatively spare over time, e.g., once every predetermined number N of MAC cycles. Otherwise, if the network is in the configuration mode (no normal data traffic), the procedure branches to step S403 where the type 1 advertisements are sent with a higher density in time, e.g., M times every MAC cycle.

When the local device 30 detects a type 1 advertisement of the neighbour coordinator 22, it sends a report R about this detection to the local coordinator 20.

In step S404, it is determined whether such a report R has been received. If not, the procedure jumps back to the start at step S401. If a report R has been received, the procedure continues at step S405 and the local coordinator 20 reports this detection to the neighbour coordinator 22. Additionally, if the global controller 10 is present (i.e. in a centralized configuration), the coordinator 20 additionally reports the detection of the neighbour coordinator 22 to the global controller 10 in step S405. These reports are labelled as type 1 reports.

Finally, in step S406, both coordinators 20, 22 update their list of neighbour coordinators and the global controller 10 may update its repository or database according to reported neighbour coordinator relations.

For the installation (or modification) of a LiFi-network, an installer can set all coordinators into the configuration mode (e.g. via the global controller 10) and walk with a device in the coverage area of the LiFi network thereby choosing locations at which coordinators are expected to have overlapping coverage. This will enable the coordinators or the global controller to quickly learn the neighbour coordinator relations.

Figure 5:
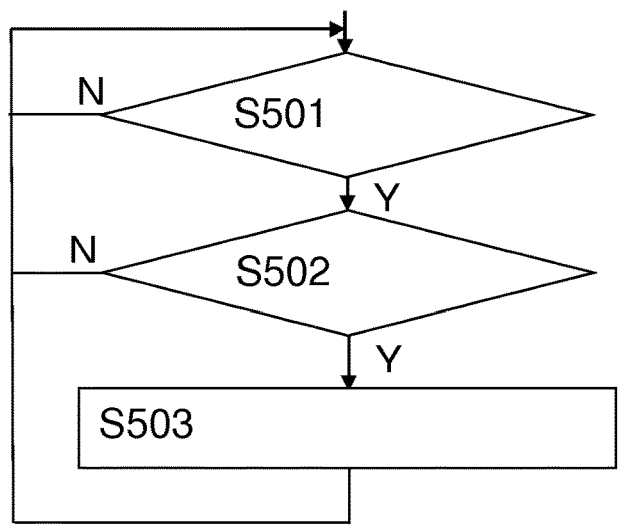
FIG. 5 shows a flow diagram of an interference detection procedure.

FIG. 5 shows a flow diagram of an interference detection process which can be implemented in various embodiments. It is an automatic continuously running process to detect if a data transfer in a reserved time slot is potentially interfered by a neighbour coordinator. Again, the process is described with reference to the network architecture of FIG. 1.

Each of the coordinators 20, 22 sends type 2 advertisements in a reserved time slot. In step S501, the local device waits until it has received a type 2 advertisement. If a type 2 advertisement has been received, the procedure continues with step S502 where it is checked if the received type 2 advertisement suffers from interference. The local device 30 may be adapted to determine the decision to report interference based on a degradation of the type 2 advertisements. For example, the signal-to-noise (S/N) ratio of an advertisement may be below a certain threshold, and/or the local device 30 was not able to decode the advertisement in N MAC cycles (e.g. with N being a number between 1 and 10, for example).

If no interference is decided in step S502, the procedure jumps back to step S501 and waits for the next type 2 advertisement. Otherwise, if a sufficient degree of interference has been determined in step S502, the procedure continues with step S503 and the local device 30 reports this interference via a report R to the local coordinator 20. These reports R are labelled as type 2 reports.

Figure 6:
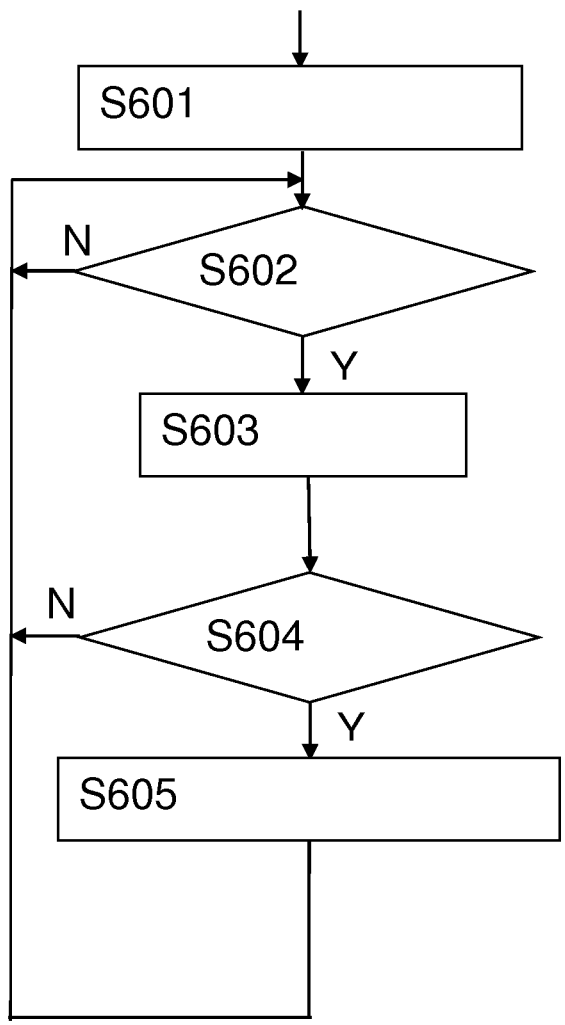
FIG. 6 shows a flow diagram of a distributed process to allocate a reserved time slot according to a first embodiment.

FIG. 6 shows a flow diagram of a distributed process to allocate a reserved time slot according to a first embodiment which can be combined with any one of the above procedures of FIGS. 4 and 5. Again, the process is described with reference to the network architecture of FIG. 1.

Each of the coordinators 20, 22 keeps track on which neighbour coordinator has allocated which reserved time slot. Based on this information, it determines for each time slot a neighbour occupancy level. Optionally, it may increase the occupancy level if it detects that the time slot suffers high interference from an unknown neighbour coordinator (e.g. based on a type 2 report of FIG. 5).

More specifically, in an initial step S601, the local coordinator 20 marks all time slots (of a predetermined set of time slots) of the MAC cycle to be not occupied and randomly allocates a reserved time slot.

Then, in step S602, the coordinator 20 waits for the reception of a report R from the local device 30 or another local device. Optionally, on reception of a type 2 report, the coordinator 20 temporarily increases the occupancy for the reserved time slot and starts a reserved time slot allocation update in step S603 and proceeds to step S604.

If the local coordinator has received a type 1 report in step S602, the local coordinator 20 and the neighbour coordinator 22 update their neighbour relations by exchanging their currently allocated time channels in step S603.

Then, in step S604, both coordinators 20, 22 determine if they have the same reserved time slot(s) allocated (i.e. same reserved time channels). If so, the procedure proceeds to step S605 where an arbitrary one of the coordinators 20, 22 performs a reserved time slot allocation update and the other one waits for the reception of a new report (i.e., returns to step S602).

More specifically, in step S605, the arbitrary one of the coordinators 20, 22 determines which slots are least occupied and randomly reserves one of them. If the arbitrary one of the coordinators 20, 22 changes its reserved time slot allocation, it informs its neighbour coordinators about this change. Then, the procedure returns to step S602 and the arbitrary one of the coordinators 20, 22 waits for the reception of a new report.

It is noted that only a single iteration may be applied for each report.

In a second embodiment, the above procedure of FIG. 6 may be varied in that the total occupancy level may be considered in step S604. E.g., on reception of a type 1 report in step S602, the local coordinator 20 and the neighbour coordinator 22 may update their neighbour relations by exchanging their current allocated time channels. If it is determined in step S604 that the local coordinator 20 and the neighbour coordinator 22 have the same reserved time channel allocated, the one with the lowest total occupancy level (and, if equal, an arbitrary one of them) performs the reserved time slot allocation update in step S605 and the other one directly proceeds to step S602 and waits for the reception of a new report.

Additionally, in a third embodiment, the above procedure of FIG. 6 may be combined with the central approach, as follows:

The coordinators 20, 22 run a distributed process as described above in connection with FIG. 6. In addition, each of the coordinator 20, 22 forwards the reports R it receives from the local device 30 or other local devices to the global controller 10. If the global controller 10 responds with an update of the reserved time slot allocation, the respective one of the coordinators 20, 22 applies this update in step S605. If the connection to the global controller 10 fails (e.g. a time-out occurs), the respective one of the coordinator 20, 22 itself determines the update for the reserved time slot allocation in step S605.

The global controller 10 may keep each of the coordinators 20, 22 up-to-date on the reserved time slot allocations of its neighbour coordinators in steps S603 and/or S605.

As an alternative, the global controller 10 may keep each of the coordinators 20, 22 up-to-date on the reserved time slot allocations and the total occupancy level of its neighbour coordinators in steps S603 and/or S605.

As a further alternative, the global controller 10 may initially determine the reserved time slots and the neighbour occupation for each of the coordinators 20, 22 and may communicate the result to each of the coordinators 20, 22. Then, the coordinators 20, 22 may run the distributed process of FIG. 6. If one of the coordinators 20, 22 detects that all time slots (of its predefined set) are occupied, it requests an update from the global controller 10.

As a still further alternative, the global controller 10 may limit the allocation of reserved time slots to a smaller set than the distributed process of FIG. 6. For example, the global controller 10 may limit itself to a set of e.g. four time slots while the coordinators 20, 22 may choose from a set of e.g. six time slots.

To summarize, in a wireless optical network (e.g. a LiFi network) with multiple coordinators or other access points, the coverage area of coordinators may overlap. Interference in the communication between coordinators and devices may occur in these overlapping coverage areas. Various embodiments propose an automatic allocation of reserved time slots to coordinators. These time slots support the coordinators to advertise their presence without interference and enable a device to detect the presence of a neighbour coordinator in a single MAC cycle. Fast detection allows fast re-scheduling of time slots in the wireless optical network in order to prevent interference when a device that enters the overlapping coverage area of two coordinators.

While the invention has been illustrated and described in detail in the drawings and foregoing description, such illustration and description are to be considered illustrative or exemplary and not restrictive. The invention is not limited to the disclosed embodiments. The proposed interference detection and handling procedures can be applied to and possibly standardized in other types of wireless networks and with other types of time frames and control fields. Moreover, the invention can be applied in any type of network devices that implement the role of a coordinator or the role of an associated device, respectively.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfil the functions of several items recited in the claims. The mere fact that certain measures are recited in mutually different dependent claims does not indicate that a combination of these measures cannot be used to advantage.

The described operations like those indicated in FIGS. 4 to 6 can be implemented as program code means of a computer program and/or as dedicated hardware of the commissioning device or luminaire device, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. A first access point for handling interference in a wireless optical network comprising at least two access points including the first access point and at least one device selectively associated via a line-of-sight connection to a respective one of the at least two access points, wherein the first access point is configured to:
    automatically allocate at least one reserved time slot of a Medium Access Control (MAC) cycle for sending advertisements by one of the at least two access points;
    receive, by the first access point, a report about a detection of a neighbouring access point from the at least one device, to report the detection to the neighbouring access point;
    update a list of neighbouring access points;
    exchange information about the at least one reserved time slot with the detected neighbouring access point in response to a detection that a same reserved time slot has been allocated to neighbouring access points;
    select, by the first access point, the at least one reserved time slot so that the selected at least one reserved time slot differs from a reserved time slot of the detected neighbouring access point; and
    update time slot allocation in response to the detection that the same reserved time slot has been allocated to neighbouring access points.

2. The first access point of claim 1, wherein the first access point is configured to report the detection of the neighboring access point to a central control entity of the wireless optical network.

3. The first access point of claim 1, wherein the advertisements are a second type of advertisements and wherein the first access point is configured to send a first type of advertisements in time slots at which contention with neighbouring coordinators may occur and the second type of advertisements in the automatically allocated reserved time slots.

4. The first access point of claim 3, wherein the first access point is configured to use the first type of advertisements for detection and the second type of advertisements for interference detection.

5. The first access point of claim 3, wherein the first access point is configured to randomly select the time slots for the first type of advertisements from a common advertisement period.

6. The first access point of claim 3, wherein the first access point is configured to increase a frequency of sending the first type of advertisements when the first access point determines that the wireless optical network is in a configuration mode.

7. The first access point of claim 1, wherein the first access point is configured to determine a neighbour occupancy level for each time slot of the MAC cycle based on reserved time slots of the neighbouring access points of said list.

8. The first access point of claim 7, wherein the first access point is configured to increase the neighbour occupancy level of a given time slot of the MAC cycle based on an interference reported for the given time slot.

9. The first access point of claim 1, wherein the first access point is configured to perform said time slot allocation update in response to the detection that the same reserved time slot has been allocated to neighbouring access points and in response to a detection that an own total occupancy level of all time slots is lower than that of the detected neighbouring access point.

10. The first access point of claim 1, wherein the first access point is configured to perform said time slot allocation update by reserving one of a group of least occupied time slots of the MAC cycle.

11. The first access point of claim 1, wherein the first access point is configured to perform the time slot allocation update based on at least one of an other allocation update and a total occupancy level of the detected neighbouring access point, received from a central control entity.

12. The first access point of claim 11, wherein the first access point is configured to request the other allocation update from the central control entity in response to a detection that all available time slots are occupied.

13. A wireless optical network comprising:
    the first access point of claim 1; and
    the at least one device recited in claim 1.

14. The first access point of claim 1, wherein said advertisements are first advertisements and wherein the report indicates that the at least one access device received, from the detected neighboring access point, a second advertisement on said automatically allocated at least one reserved time slot.

15. The first access point of claim 14, wherein the first access point is configured to transmit data on the selected at least one reserved time slot.

16. The first access point of claim 15, wherein the at least one device possessed, when the at least one device received said second advertisement, a line-of-sight with the first access point and with the detected neighboring access point.

17. A method implemented at a first access point for handling interference in a wireless optical network comprising at least two access points including the first access point and at least one device selectively associated via a line-of-sight connection to a respective one of the at least two access points, the method comprising the first access point:
    automatically allocating at least one reserved time slot of a Medium Access Control (MAC) cycle for sending advertisements by one of the at least two access points;
    receiving, by the first access point, a report about a detection of a neighbouring access point from the at least one device, to report the detection to the neighbouring access point;
    updating a list of neighbouring access points;
    exchanging information about the at least one reserved time slot with the detected neighbouring access point in response to a detection that a same reserved time slot has been allocated to neighbouring access points;
    selecting, by the first access point, the at least one reserved time slot so that the selected at least one reserved time slot differs from a reserved time slot of the detected neighbouring access point; and
    updating time slot allocation in response to the detection that the same reserved time slot has been allocated to neighbouring access points.

18. A non-transitory computer readable medium storing instructions that are configured to cause by one or more processors to perform the method of claim 17 when the instructions are executed by the one or more processors.

19. The method of claim 17, wherein said advertisements are first advertisements and wherein the report indicates that the at least one access device received, from the detected neighboring access point, a second advertisement on said automatically allocated at least one reserved time slot.

20. The method of claim 19, further comprising transmitting, by the first access point, data on the selected at least one reserved time slot.

\* \* \* \* \*